United States Patent [19]

Paden

[11] Patent Number: 5,631,506
[45] Date of Patent: May 20, 1997

[54] SLOPED FACET ELECTROMAGNETIC ACTUATOR ADAPTED FOR VIBRATION COMPENSATION

[75] Inventor: Bradley E. Paden, Goleta, Calif.

[73] Assignee: Tritium Technologies, Mesa, Ariz.

[21] Appl. No.: 358,064

[22] Filed: Dec. 14, 1994

[51] Int. Cl.[6] .......................... H02K 5/24; H02K 41/00; H02K 15/00
[52] U.S. Cl. ........................ 310/51; 310/12; 29/596
[58] Field of Search ........................ 248/638, 550, 248/636; 310/12, 51, 103, 105; 29/596

[56] References Cited

U.S. PATENT DOCUMENTS

| | | | |
|---|---|---|---|
| 3,868,082 | 2/1975 | Soderqvist | 248/358 R |
| 4,483,425 | 11/1984 | Newman | 188/378 |
| 4,498,038 | 2/1985 | Malueg | 318/648 |
| 4,531,699 | 7/1985 | Pinson | 248/550 |
| 4,595,166 | 6/1986 | Kurokawa | 248/559 |
| 4,600,863 | 7/1986 | Chaplin et al. | 318/114 |
| 4,624,435 | 11/1986 | Freudenberg | 248/550 |
| 4,638,983 | 1/1987 | Idigkeit et al. | 267/140 |
| 4,648,576 | 3/1987 | Matsui | 248/550 |
| 4,650,170 | 3/1987 | Fukushima | 267/140 |
| 4,699,348 | 10/1987 | Freudenberg | 248/550 |
| 4,705,257 | 11/1987 | Leo et al. | 248/611 |
| 4,730,541 | 3/1988 | Greene | 91/362 |
| 4,735,296 | 4/1988 | Pinson | 188/379 |
| 4,793,599 | 12/1988 | Ishioka | 267/140 |
| 4,796,873 | 1/1989 | Schubert | 267/136 |
| 4,821,205 | 4/1989 | Schutten | 364/508 |
| 4,850,261 | 7/1989 | Greene | 91/362 |
| 4,869,474 | 9/1989 | Best et al. | 267/136 |
| 4,922,159 | 5/1990 | Phillips et al. | 318/128 |
| 5,000,415 | 3/1991 | Sandercock | 248/550 |
| 5,011,108 | 4/1991 | Chen et al. | 248/550 |
| 5,060,519 | 10/1991 | Chojitani et al. | 73/662 |
| 5,121,898 | 6/1992 | Yasuda et al. | 248/550 |
| 5,133,527 | 7/1992 | Chen et al. | 248/550 |
| 5,148,068 | 9/1992 | Kushida et al. | 310/46 |
| 5,156,370 | 10/1992 | Silcox et al. | 248/550 |
| 5,170,104 | 12/1992 | Laughlin | 318/135 |
| 5,208,497 | 5/1993 | Ishii et al. | 310/12 |
| 5,209,326 | 5/1993 | Harper | 188/378 |
| 5,236,186 | 8/1993 | Weltin et al. | 267/140 |
| 5,275,388 | 1/1994 | Kobayashi et al. | 267/140 |
| 5,291,967 | 3/1994 | Aoki | 180/312 |
| 5,297,781 | 3/1994 | Gennesseaux | 267/140 |
| 5,535,853 | 7/1996 | Skalski | 187/410 |

FOREIGN PATENT DOCUMENTS 3-66952  3/1991  Japan.

OTHER PUBLICATIONS

"Vibration Isolation Uses Piezo–Ceramic Elements to Yield Ultra–Quite Platforms", Electronic Design, Aug. 8, 1994, pp. 36 & 37.

Primary Examiner—Steven L. Stephan
Assistant Examiner—Michael Wallace, Jr.
Attorney, Agent, or Firm—Cahill, Sutton & Thomas P.L.C.

[57] ABSTRACT

An electromagnetic actuator includes a ferromagnetic plate and an electromagnet, both of which have adjacent surfaces with corresponding sloped facets that define a non-uniform gap. A nominal spacing of the gap is maintained by elastomer, preferably located within the gap. The gap spacing between corresponding sloped facets is substantially less than for other portions of the gap and favors flow of magnetic flux. In one embodiment, multiple parallel-connected electromagnets are magnetically coupled to the same faceted ferromagnetic plate such that sloped facets of the various electromagnets and corresponding or matching sloped facets of the ferromagnetic plate are oriented in different directions. A weighted average of the coil currents of the electromagnets determines the net translation of the ferromagnetic plate. The actuators are used in vibration control systems.

20 Claims, 13 Drawing Sheets

FIG_2
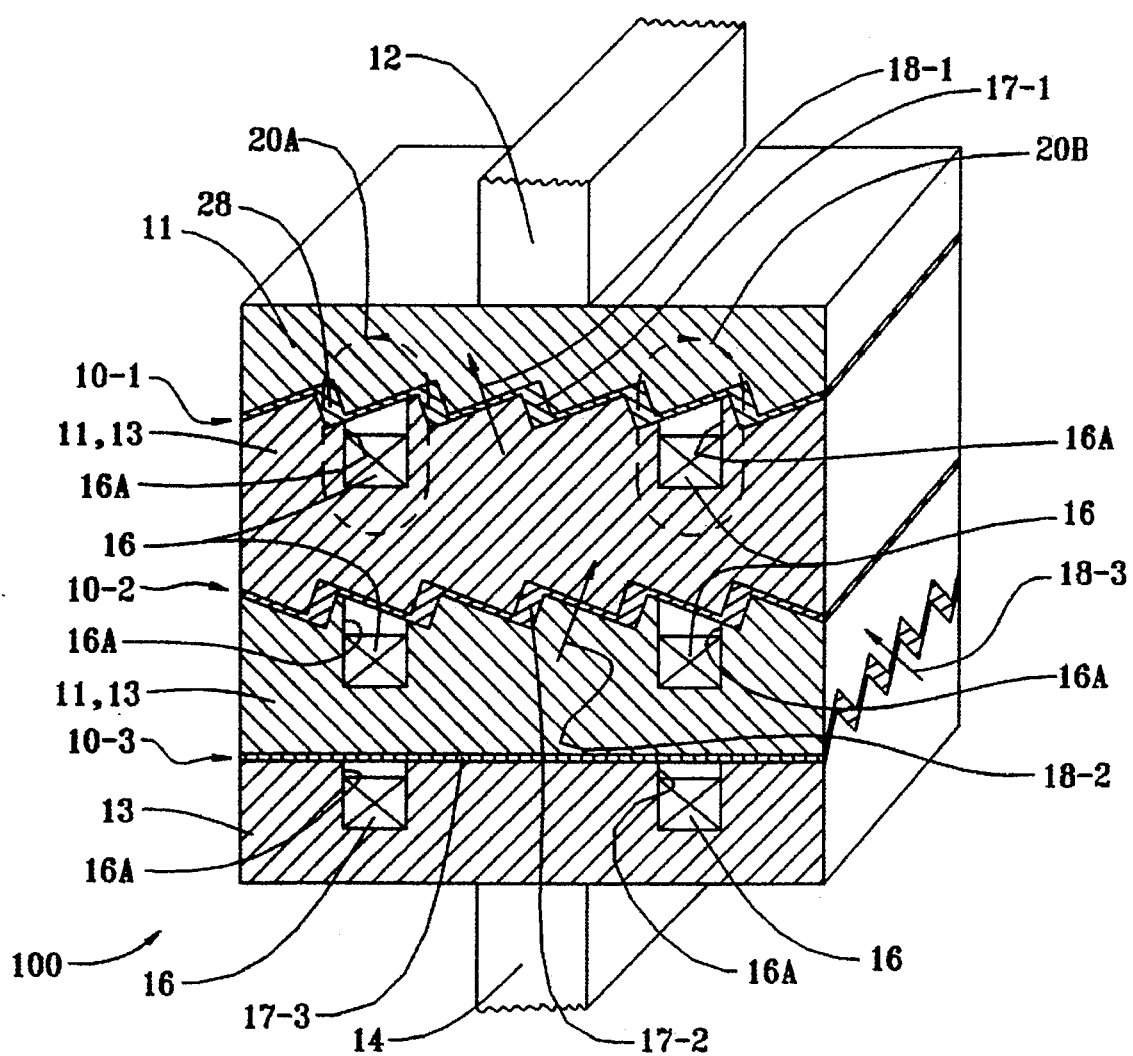

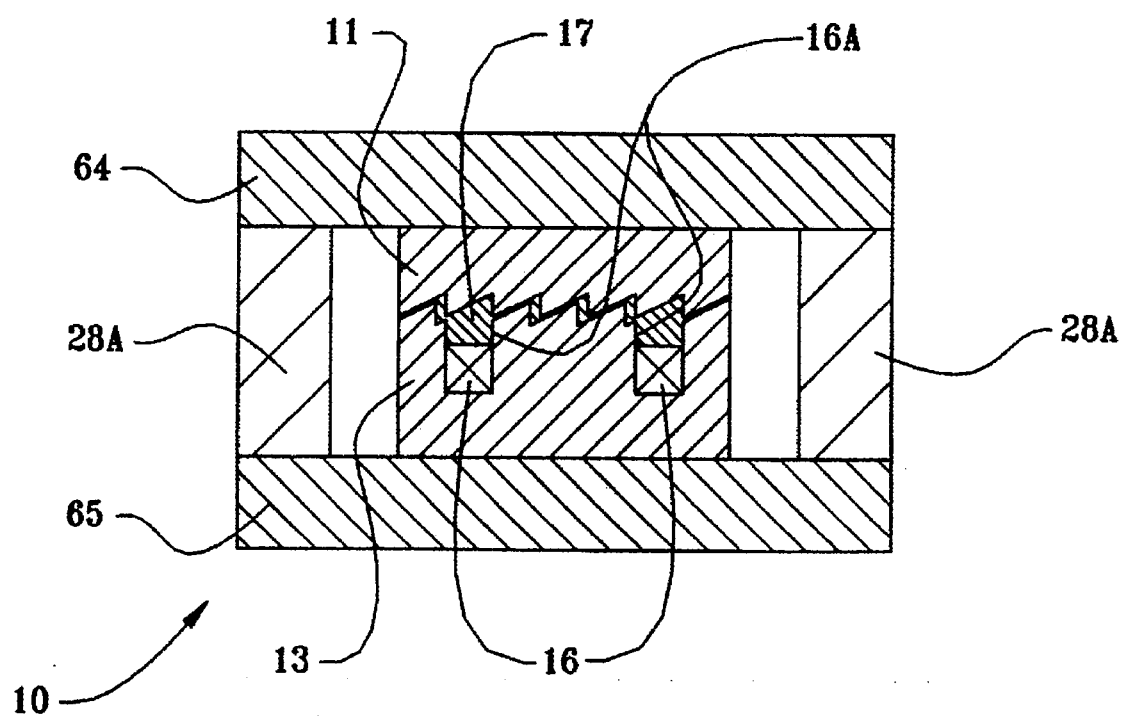

SLOPED FACET ELECTROMAGNETIC ACTUATOR ADAPTED FOR VIBRATION COMPENSATION

BACKGROUND OF THE INVENTION

The invention relates generally to fine motion actuators, particularly to low cost, compact actuators, and still more particularly to active electromagnetic actuators and vibration control elements.

Various systems are subject to a broad range of internally and externally caused vibration and are in need of isolation from such vibration. Harmful vibrations may occur in precision photolithographic equipment used in semiconductor manufacturing such as the so-called "steppers" for repeating photoresist patterns on a silicon wafer. Such vibrations may be due to internal motions of stepper components or to external sources such as seismic activity, traffic on nearby streets, personnel walking in a building, heating and ventilation equipment etc. The root-mean-square amplitudes of the displacements associated with these vibrations is nominally in the 1 to 10 micrometer range, and can limit the accuracy of the patterns formed on the silicon wafer. The frequency range in which feedback controlled vibration isolation is most valuable is the 1 to 50 Hz range. Integrated circuit manufacturers need to eliminate mechanical vibrations that affect lithography and other process steps. Passive isolation using air springs or supports is usually sufficient for isolation from vibrations with frequencies above about 50 Hz. Another example of a need for isolation from vibration is the need for engine mounts that are capable of isolating an engine support from vibrations produced by imbalances within the engine.

In some cases, electromagnetic damping systems similar to the vibration-damping mount disclosed in U.S. Pat. No. 4,624,435 (Freudenberg) can be used to reduce the effective undesirable vibration. U.S. Pat. No. 4,624,435 describes a vibration damping resilient mount where the passive mechanical damping of the resilient mount is augmented substantially by passive electromechanical damping accomplished with a resistor connected across an induction coil moving in a magnetic field. Active vibration cancellation, isolation, or compensation can be utilized wherein displacements of equal magnitude and 180° out of phase with undesired vibrations are applied by means of various controlled actuators to the device to prevent it from vibrating, for example as described in U.S. Pat. No. 4,531,699 and U.S. Pat. No. 5,011,108. Various other known actuators use piezoelectric materials or magnetostrictive materials, but such actuators generally are very expensive.

There clearly is an unmet need for an inexpensive actuator for accurate operation, compact in size, and capable of effectively producing fine translation, for example to produce cancellation forces to isolate, cancel, or compensate vibrations in the range from 1 to 50 hertz in a mechanical system.

SUMMARY OF THE INVENTION

Accordingly, it is an object of the invention to provide a low cost electromagnetic actuator which can be used effectively in isolating a wide range of vibrations in a mechanical system.

It is another object of the invention to provide a low cost, accurate, multi-dimensional fine motion translator.

It is another object of the invention to provide an actuator which operates at low voltages relative to voltages required for piezoelectric transducers, so low cost and increased safety of the actuator can be achieved by using low voltage amplifiers.

It is another object of the invention to provide a low-cost, multi-dimensional force actuator.

Briefly described, and in accordance with one embodiment thereof, the invention provides an electromagnetic actuator including a ferromagnetic plate and an electromagnet, both of which have adjacent surfaces with corresponding sloped facets that define a non-uniform gap. A nominal spacing of the gap is maintained by elastomer material, which preferably is within the gap. The spacing between the corresponding sloped facets is substantially less than for other portions of the gap and defines "active" portions of the gap. The flow of magnetic flux and the locations of resulting Maxwell force vectors are concentrated at, and are perpendicular to, the sloped facets constituting the active portions of the gap. In one embodiment, actuators with multiple degrees of freedom are obtained by stacking multiple actuators in series such that their sloped facets are oriented in different directions, for example so that the perpendicular Maxwell force vectors of the sloped facets of the various actuators are oriented in the directions of different coordinate axes, respectively. In another embodiment, actuators which have multiple degrees of freedom and which are more compact than the closest prior art are obtained by positioning multiple electromagnets adjacent to a common ferromagnetic plate such that sloped facets of the various electromagnets are oriented in different directions. The coil displacement affected by the currents of the electromagnets of the multiple actuators are linearly independent, and a weighted average of their coil currents determines the net translation of the ferromagnetic plate relative to the electromagnets. The actuators are used in conjunction with elastomer vibration insulators, velocity, position, or force sensors, and electronic controller feedback circuits to provide very low cost, accurate vibration cancellation in vibration isolator systems that isolate or cancel low frequency vibrations.

BRIEF DESCRIPTION OF THE DRAWINGS

FIG. 2 is a partial perspective view of an 3 DOF electromagnetic actuator including three series-connected 1 DOF actuators.

FIG. 10 is a diagram of an electromagnetic actuator using elastic material located outside of the gap across which magnetic flux flows.

DETAILED DESCRIPTION OF THE PREFERRED EMBODIMENTS

Figure 1:
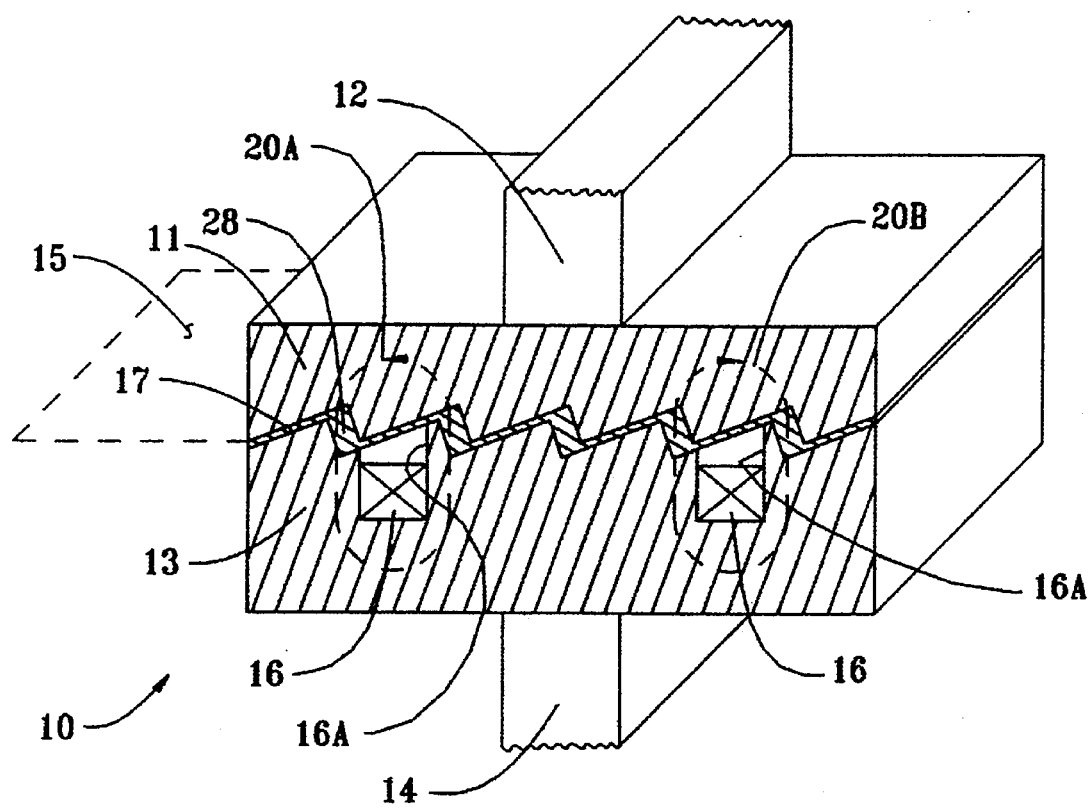
FIG. 1 is a partial perspective view of a 1 DOF (degree of freedom) electromagnetic actuator of the present invention.
Figure 1A:
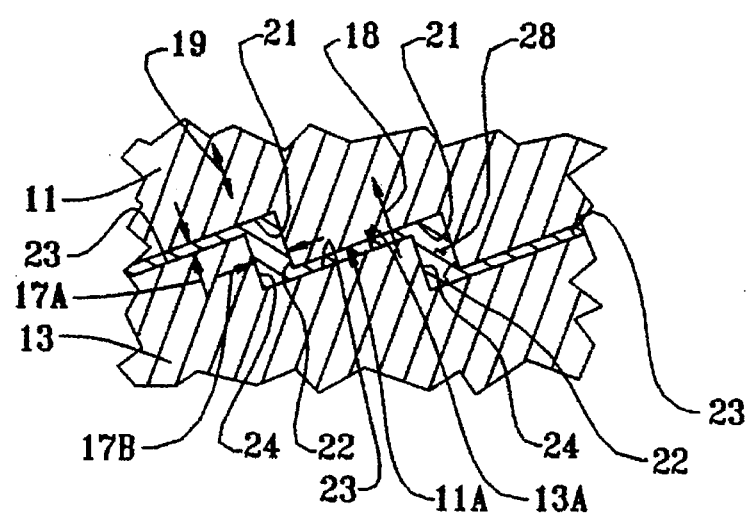
FIG. 1A is an enlarged partial section view of detail 1A of FIG. 1.

Referring to FIGS. 1 and 1A, electromagnetic actuator 10 includes an electromagnet 13 and a ferromagnetic target 11 separated by a non-uniform gap 17, which preferably is at least partially filled with elastomer 28; elastomer 28 can be natural rubber, synthetic silicone rubber, urethane elastomer, or the like. Elastomer 28 preferably is adhesively attached or molded into gap 17. The bottom of electromagnet 13 is anchored or attached to a suitable support, stud, or connector 14. The faceted upper surface of electromagnet 13 includes a suitable number of sloped facets 23 (FIG. 1A) which are "oriented" upward and to the left. A sloped facet is considered to be "oriented" in the direction pointed to by a line perpendicular to that facet. Sloped facets 23 are considered to be "sloped" relative to the "mean surface" 15 of the upper surface 13A of electromagnet 13. The upper surface 13A of electromagnet 13 also includes a number of sloped facets 24 which may be vertical, or sloped upward and to the right of the mean surface 15 as shown.

The upper surface of ferromagnetic target 11 is connected to a suitable load or support by a post, stud, or other suitable connector 12. Lower surface 11A of ferromagnetic target 11 has a number of sloped facets 21 which are parallel to various corresponding sloped facets 23 of electromagnet 13. Lower surface 11A of ferromagnetic target 11 also has sloped facets 22 which are parallel to corresponding facets 24 of electromagnet surface 13A. Each pair of the corresponding sloped facets 21 and 23 defines a relatively narrow portion of gap 17 having a spacing 17A. Each pair of facets 22 and 24 forms a relatively thick portion of gap 17 having a spacing 17B. Thus, gap 17 is non-uniform.

The relatively narrow portions of gap 17 having spacing 17A are referred to as the "active" portions, and the wider portions having the spacing 17B are referred to as "inactive" portions of the gap. The ratio of the spacing of the "wide" inactive gaps to the "narrow" active gaps preferably is about 3 to 1. This causes the magnetic field to be about 3 times higher in the active gaps, and the Maxwell force per unit area on the sloped facets 21 and 23 is about 9 times higher than on the facets 22 and 24. The effect of Maxwell force components on the facets 22 and 24 in the direction of the sloped facets 21 and 23 is negligible. The absolute size of the gap spacing should be on the order of 10–100 times the desired peak-to-peak range of motion range of ferromagnetic plate 11 relative to electromagnet 13.

A coil 16 is embedded in an annular coil slot 16A formed in the upper surface of electromagnet 13. Two coil terminals (not shown) are connected to a suitable control system which may include a suitable position sensor or velocity sensor to measure the position or velocity of ferromagnetic target 11 relative to electromagnet 13 and provide a feedback signal used by the control system to determine the coil drive current. The sensors may be placed elsewhere in the vibration control system, or, if the needed control motion is known a priori, there is no need to use sensors.

Current forced through coil 16 causes magnetic flux to flow through the ferromagnetic material of the body of electromagnet 13, across gap 17, and through the material of ferromagnetic target 11 in the directions of flux paths 20A and 20B. A relatively low proportion of the magnetic flux produced by, current in coil 16 flows across the "inactive" portions of gap 17 because of the higher magnetic reluctance resulting from their greater spacing 17B. Instead, the flow of magnetic flux favors the lower reluctance parallel path formed by the active portions of gap 17.

Magnetic flux flowing through each active portion of gap 17 produces a normal (perpendicular) force in the direction of arrow 18 (FIG. 1A), attempting to reduce the spacing of the active portions of gap 17 by urging the sloped facets 21 and 23 toward each other, compressing the elastomer material 28. The force produced across active portion of gap 17 by magnetic flux thereat is known as a Maxwell force, and acts parallel to the magnetic flux lines; it is equal to $$F = \frac{B^2}{2\mu_0} A,$$

where B is the magnetic field at the surface, $\mu_o$ is the permeability of air, and A is the effective area of a sloped facet forming that "active" area. The precise orientations of the inactive portions of gap 17 are relatively unimportant since relatively little force is generated there.

In FIG. 1A, numeral 15 represents the above mentioned "mean surface" of electromagnet 13. That is, numeral 15 represents a hypothetical plane, wherein at each point the vertical coordinate is the average of all of the nearby vertical coordinates of upper surface 13A of electromagnet 13.

Figure 1B:
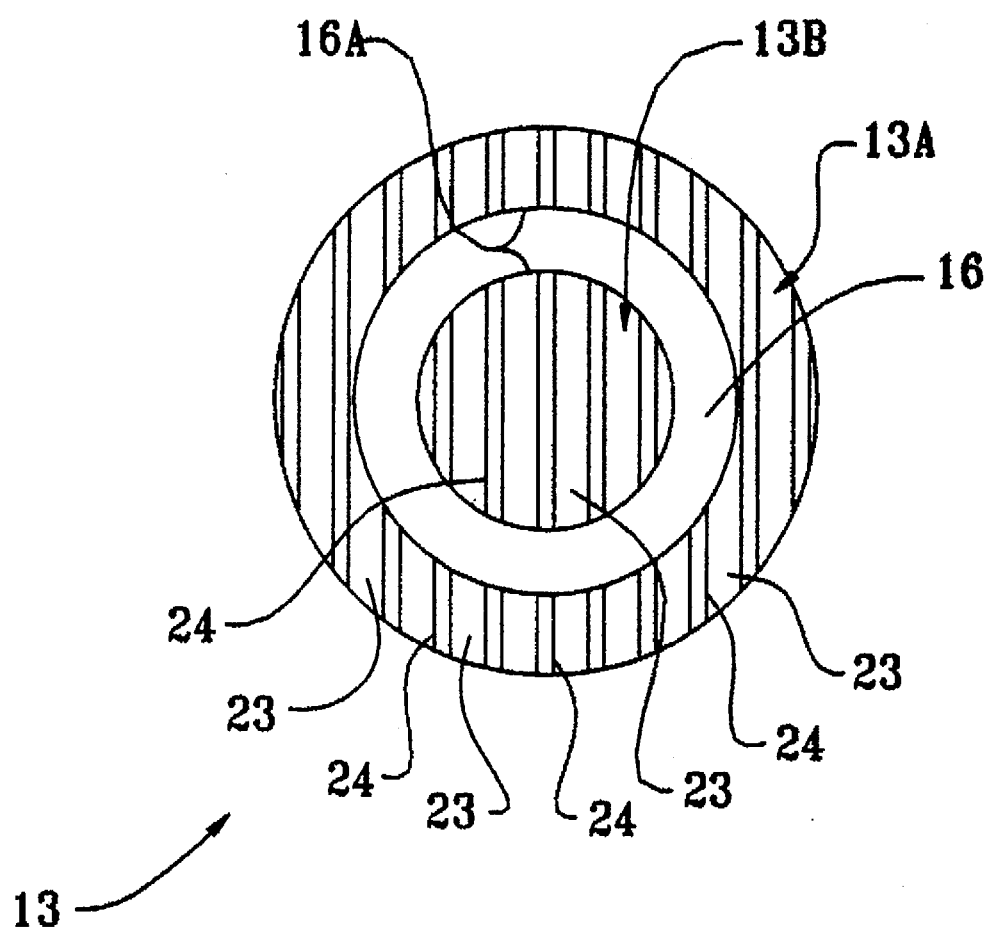
FIG. 1B is a top view of the electromagnet of an actuator similar to that of FIG. 1 except with a circular rather than square body shape.

The body of electromagnet 13 can be rectangular, and the body of ferromagnetic target 11 also can be rectangular, as indicated in FIG. 1. Or, the body of electromagnet 13 can be circular as shown in FIG. 1B, which is a top view of an electromagnet similar to electromagnet 13 in FIG. 1 except that its body is cylindrical rather than rectangular. As shown in FIG. 1B, sloped facets 23 all are parallel to each other, and sloped facets 24 all are parallel to each other.

The actuator 10 shown in FIGS. 1 and 1A is referred to as a "one degree of freedom" (1 DOF) actuator because the Maxwell force compressing the active portions of its non-uniform gap results in translation of ferromagnetic target 11 relative to electromagnet 13 in only one direction, that is, in the direction perpendicular to the sloped facets 21 and 23.

A DC bias current forced by a control circuit (such as control circuit 47 in FIG. 7) through the windings of coil 16 produces a DC magnetic bias flux through the "active" portion of gap 17 to thereby maintain a nominal "mid range" compressive Maxwell force on the elastomer 28 in gap 17. Controlled translations of ferromagnetic plate 11 in both of the opposed directions 19 (FIG. 1A) of the Maxwell force vector 18 then can be produced by increasing or decreasing the coil current in response to suitable control signals (such as 46A and 46B in FIG. 7).

FIG. 2 shows a three degree of freedom (3 DOF) actuator 100 including three 1 DOF actuators 10-1, 10-2, and 10-3 rigidly connected in series. (Note that the same or similar reference numerals are used herein to designate the same or similar parts of the various disclosed embodiments of the invention.) The body of the electromagnet 13 of actuator 10-1 also serves as the ferromagnetic plate of actuator 10-2, as also indicated by 11,13. Similarly, the body of the electromagnet of actuator 10-2 serves as the ferromagnetic plate of actuator 10-3, as indicated by 11,13. The active portions of the gaps 17-1 and 17-2 of actuators 10-1 and 10-2 are sloped oppositely relative to the mean surface 15 (FIG. 1) of either of the electromagnets of actuators 10-1 and 10-2. More specifically, the active portions of gap 17-1 of actuator 10-1 can be thought of as sloped in one coordinate direction, the active portions of gap 17-2 of actuator 10-2 can be thought of as being sloped in another coordinate direction, and the active portions of gap 17-3 of actuator 10-3 can be thought of as being sloped in a third coordinate direction. The angles of the "active" sloped facets relative to their corresponding mean surfaces can be from 0 to roughly 90 degrees, and therefore can be conveniently selected to produce arbitrary translations measured with respect to the x,y,z cartesian coordinate system.

The directions of increases of the Maxwell force vector produced by increasing the coil currents of actuators 10-1, 10-2, and 10-3 are indicated by vectors 18-1, 18-2, and 18-3, respectively. The compressive forces produced by these force vectors result in translation of ferromagnetic target 11 along the directions of vectors 18-1, 18-2, and 18-3, respectively. If these three vectors all are at right angles to each other, then the translation is along the x,y,z cartesian coordinate axes. Thus, three independent motions of upper connector 12 relative to lower connector 14 are achieved by independently controlling the coil currents of actuators 10-1,2, and 3 using a weighted average of the three coil currents so as to accomplish an arbitrary three-dimensional motion of upper connector 12 relative to lower connector 14. The directions of vectors 18-1, 18-2, and 18-3 need not be at right angles to each other. The actuator will still produce 3 DOF motion, even if they are not mutually perpendicular.

The consequence of the non-uniform spacing of gap 17 is that the narrow, "active" portions or "facet gaps" provide the favored flux path, and the Maxwell forces produced by magnetic flux flowing across these active facet gaps are the dominant translation-causing forces. It should be noted that the number and size of the "active" sloped facets is relatively unimportant. What is most important is that the spacing of the active facet gaps is small relative to the spacing of the inactive facet gaps.

The ferromagnetic material of which ferromagnetic target 11 and the body of electromagnet 13 are composed can, for example, be 4% silicon iron, vanadium permendur, nickel-iron, or the like. Although gap 17 has been described as being filled with elastomer 28, alternatively the elastomer could be external to the gap as shown in FIG. 10. Also, the external elastomer could be replaced by other elastic material, such as metal springs.

Figure 3A:
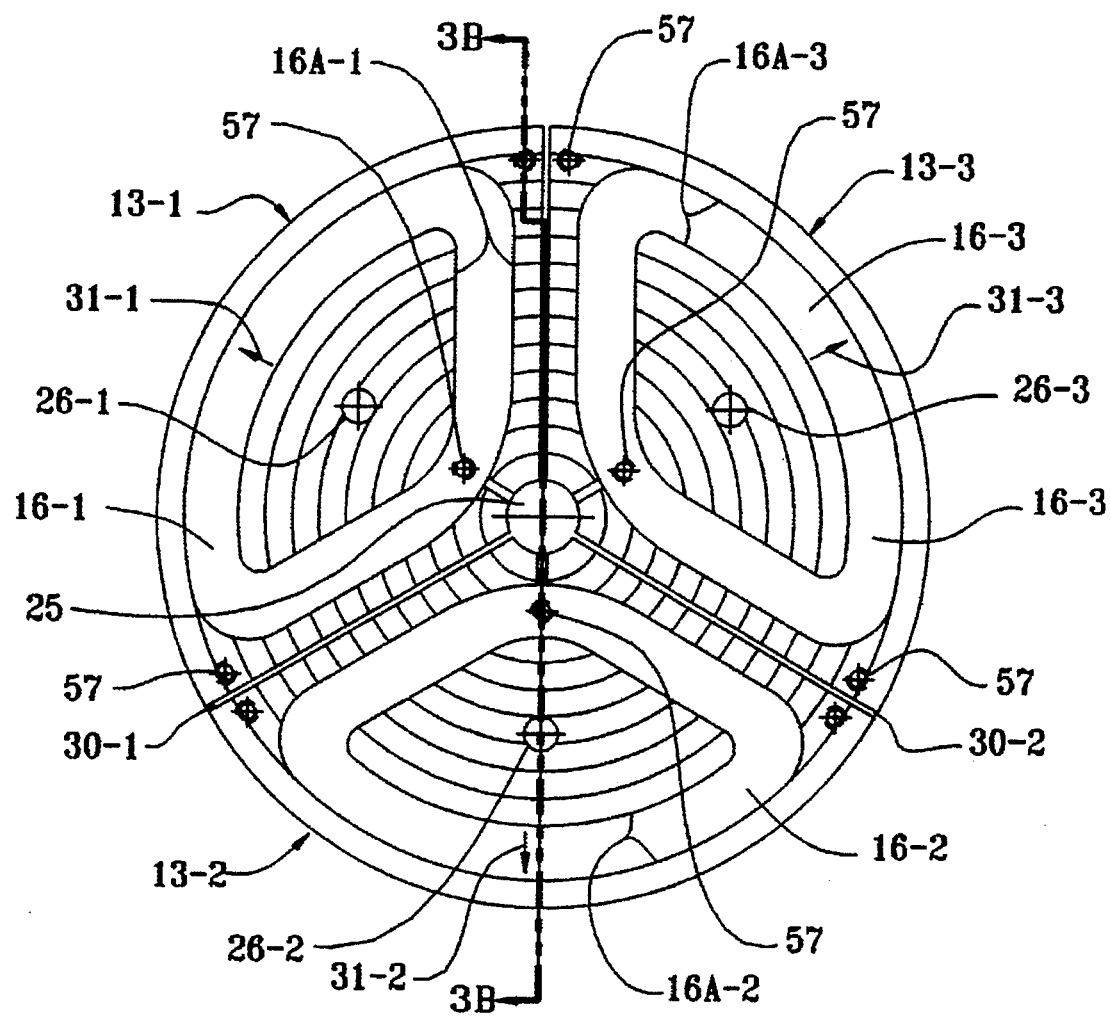
FIG. 3A is a top view of the portion of a three-dimensional actuator including three parallel-connected electromagnets thereof.

FIGS. 3A–3E illustrate a parallel combination of three actuators with concentric, rather than parallel sloped facets assembled to provide a compact 3 DOF actuator. It is preferable that the concentric sloped facets in the embodiment of FIGS. 3A–E be "equi-spaced"; the corresponding parallel sloped facets in the embodiments of FIGS. 1 and 2 also are mating and preferred to be "equi-spaced". In FIG. 3A, which shows a top view of three parallel-connected electromagnets 13-1,2, and 3 of the actuator, it can be seen that electromagnets 13-1,2, and 3 can be rigidly attached to an aluminum or other non-ferromagnetic support plate 27 (indicated by dotted lines in FIG. 3B) by various screws 57 extending through various clearance holes the bottom of support plate 27 into threaded holes 57A in the bottoms of electromagnets 13,1,2, and 3. Three coils (not shown) are disposed in coil slots 16A-1,2, and 3, respectively.

Figure 3B:
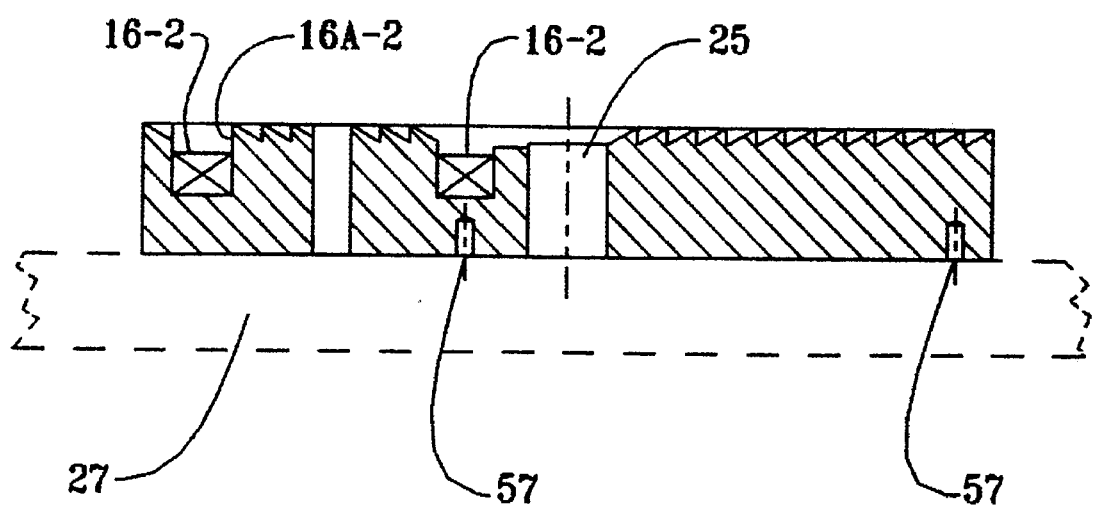
FIG. 3B is a sectional view taken along section line 3B—3B of FIG. 3A.
Figure 3C:
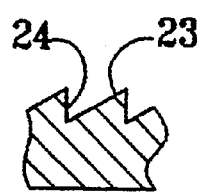
FIG. 3C is an enlarged partial section view illustrating the sloped facets defining a non-uniform gap between one of the electromagnets in FIG. 3A and the ferromagnetic target plate of FIG. 3D.
Figure 3D:
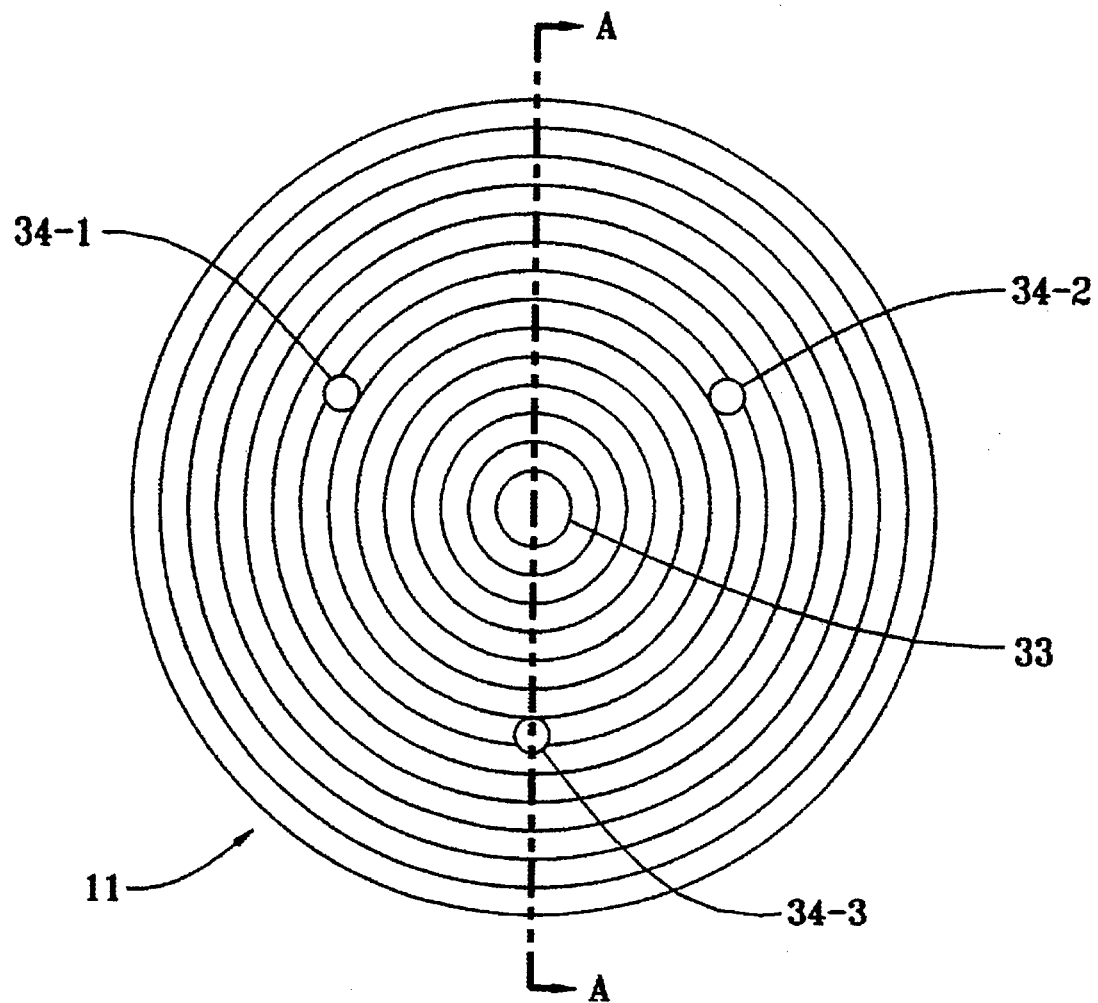
FIG. 3D is a bottom view of the ferromagnetic target plate constituting the upper portion of 3 DOF actuator formed by the three electromagnets of FIG. 3A and the ferromagnetic target plate of FIG. 3D.

A single ferromagnetic target plate 11, a bottom view of which is shown in FIG. 3D, is attached to a top of electromagnets 13,1,2,3 by elastomer 28 filling the various active and inactive portions of gap 17 defined by the sloped faceted upper surfaces of electromagnets 13-1,2, and 3 and the sloped faceted bottom surface of ferromagnetic target plate 11. A suitable connector can be attached to ferromagnetic target plate 11 by means of threaded holes 34-1,2, and 3.

FIG. 3B shows the sloped facets of the upper surface of semi-cylindrical electromagnets 13-1 and 13-2 along section line 3B—3B of FIG. 3A. In this embodiment of the invention, the inactive portions of gap 17 are vertical, rather than sloped. Since relatively little force is generated across the inactive gaps, their exact orientations are relatively unimportant. However, the effect of flow of magnetic flux along the inactive facets toward the active facets can be considered in the actuator design. A sloped inactive facet can be used to focus and increase the magnetic field in the active facet if higher forces are desired there.

Figure 3E:
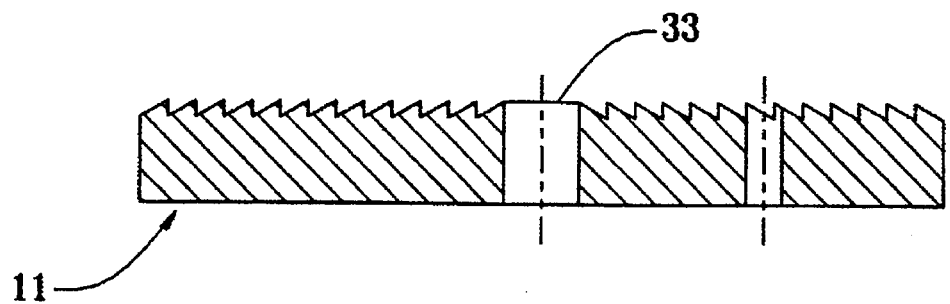
FIG. 3E is a section view along section line 3E—3E of FIG. 3D.

FIG. 3C shows an enlarged detail of the sloped facets of FIG. 3B. In the embodiment of FIGS. 3A–E, the diameter of the actuator is 6.450 inches. The radial spacing between successive peaks of the faceted upper surface of each of electromagnets 13-1,2, and 3 is 0.23 inches. The height of each peak is 0.133 inches. The radial spacing between successive peaks is 0.23 inches. FIG. 3E shows a section view along section line 3E—3E of ferromagnetic target 11 shown in FIG. 3D. The spacing and depth of the peaks of the lower surface of ferromagnetic plate 11 are the same as for the upper surfaces of electromagnets 13-1,2,3. The thickness of the elastomer 28 between the active gap portions of the 3 DOF actuator formed by electromagnets 13-1,2,3 and ferromagnetic target plate 11, i.e., the spacing between corresponding "active" sloped facets of each, is 0.015 inches. The spacing between the corresponding "inactive" vertical facets of electromagnets 13-1,2,3 and ferromagnetic plate 11 is the same, 0.050 inches.

Preferably, the design of electromagnets 13-1,2, and 3 is such that the area of the upper surface of each electromagnet surrounded by each of the coils is approximately equal to the area of the same surface outside of the coil. The flux traverses a loop. If the coil current is clockwise looking at the page, then the flux goes down through the area inside the coil and up through the area outside of it. To avoid saturating the ferromagnetic material in one such area prior to the other, the inside and outside areas are matched. This will minimize the current required to achieve maximum actuator displacement. Each coil (16) always fills a coil slot 16A and the specific wire size is chosen to achieve a desired coil resistance to match the amplifier characteristics; a 4–8 ohm range is nominal.

The current density in the coils 16 is roughly independent of wire length (i.e., number of turns), and ranges from 0 to about 4000 amperes per square inch with a bias at about 2800 amperes per square inch. The compression of elastomer 28 due to resulting Maxwell forces ranges from 0 to about 20 micrometers when an elastomer with a Young's Modulus of 200 psi is used. Forces in the range of zero to about 200 pounds can be generated in response to coil current densities ranging from zero to 4000 amperes per square inch. The coil cross sections are 0.635 inches deep by 0.500 inches wide.

In the electromagnetic actuator comprised of the electromagnets shown in FIG. 3A, the ferromagnetic plate shown in FIG. 3D, and the elastomer 28 filling gap 17 therebetween, the individual electromagnets 13-1,2, and 3 are magnetically isolated from each other by 0.05 inch slits 30-1,2,3, respectively, with non-magnetic gaps between the electromagnets 13-1,2, and 3; the slits 30-1,2,3 can be filled with non-magnetic material such as bronze to prevent cross-coupling, i.e., flow of magnetic flux between electromagnets.

Figure 4:
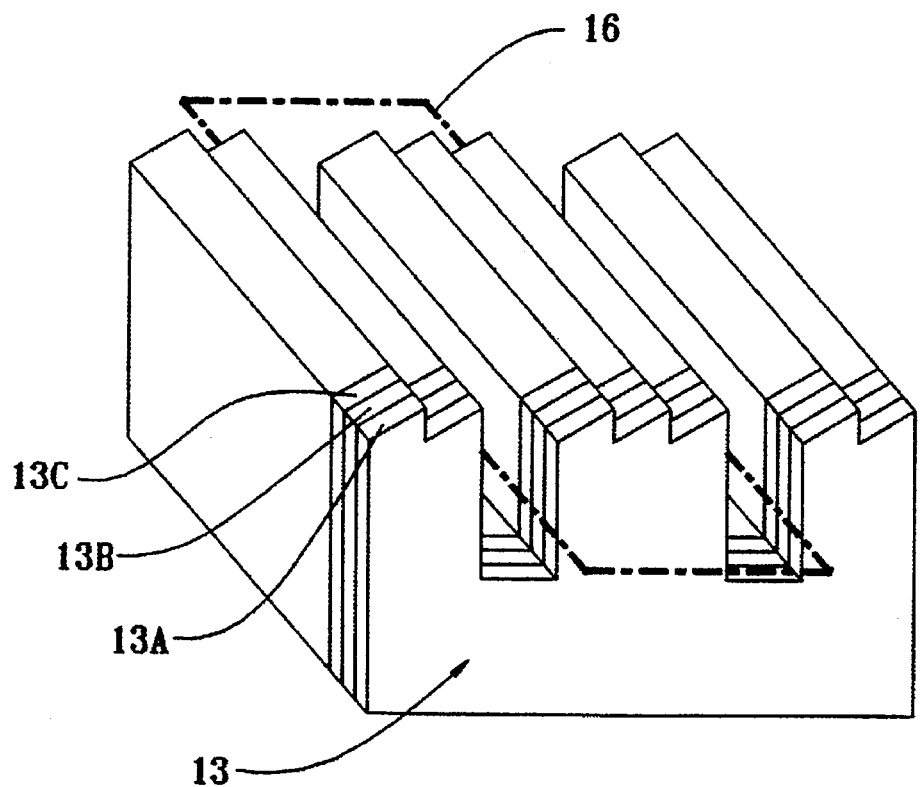
FIG. 4 is a partial perspective diagram illustrating an electromagnet composed of laminations.

If desired, the body of each electromagnet 13 can be formed of laminations such as 10A and 10B as shown in FIG. 4; this is most practical if the body shape is rectangular. The electrical coil can extend around the ends of the spaced coil slots, as indicated by dotted line 16.

Use of laminations reduces eddy currents, improving the electrical efficiency of the actuator. Use of laminations also increases the frequency response of an actuator, because at higher frequencies eddy currents circulate in the actuator in the direction opposite to the coil current. Their effect is to partially cancel the effects of the control current at higher frequencies. The frequency response is increased by eliminating such eddy currents. Use of laminations as shown can increase the upper frequency response of the actuators of the present invention to several hundred hertz or perhaps even several thousand hertz.

As mentioned above, a DC bias current can be maintained in a coil 16 of the previously described embodiments of the invention to maintain a bias flux and hence a bias force that pulls the ferromagnetic target 11 and the electromagnet 13 together, compressing the elastomer 28 in the gap 17 to approximately the middle of the desired translation range. Translation of ferromagnetic target 11 relative to electromagnet 13 in either direction from the mid-range value established by the bias flux then is accomplished by superimposing appropriate control currents on the bias current, to thereby add or subtract a control flux to or from the bias flux to thereby increase or decrease the compressive force on the elastomer 28 in the active portions of gap 17.

Figure 5:
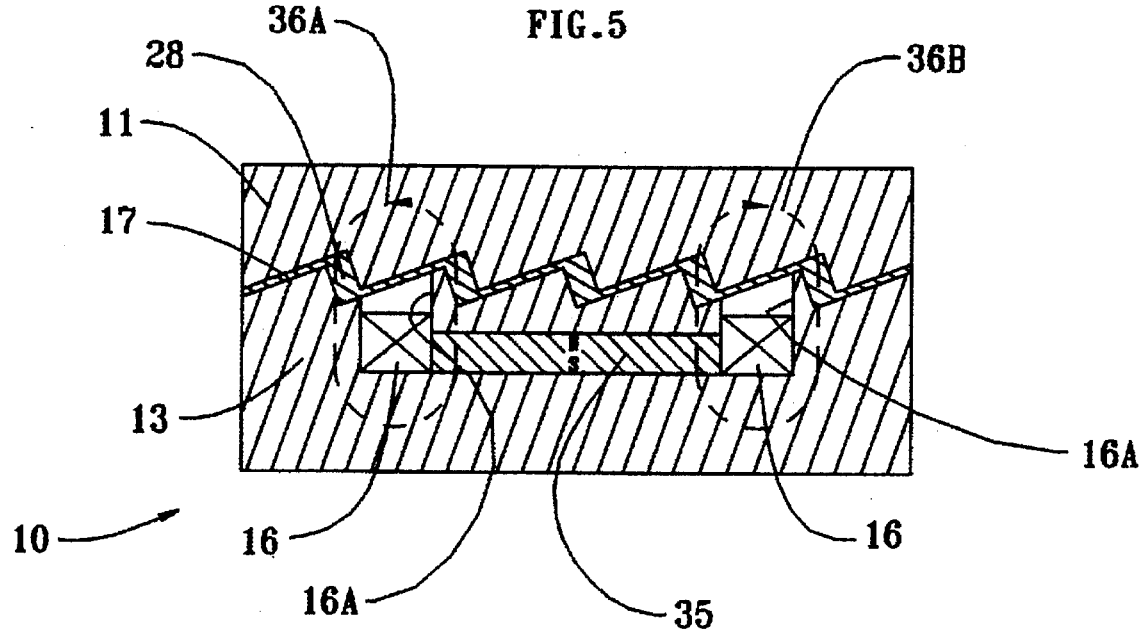
FIG. 5 is a section view illustrating use of a permanent biasing magnet in an electromagnetic actuator of the present invention.

Alternatively, a suitably located permanent magnet can be provided in the electromagnet structure to produce the bias flux. FIG. 5 shows one structure that accomplishes this, wherein bias magnet 35 is disposed within coil 16 in the body of electromagnet 13. Bias magnet 35 produces bias flux in the paths and in the directions indicated by dotted lines 36A and 36B and the associated arrow heads. Since the compressive forces across active portions of gap 17 are proportional to the square of the magnetic flux D, it is efficient and effective, for example as in step motors and other electromagnetic actuators, to use a permanent magnet to provide a bias flux. However, a disadvantage of this technique is that the control flux produced by control currents or control current variations in coil 16 passes through the reluctance of permanent magnet 35; because of the increased reluctance, the sensitivity of the flux to the coil current is reduced.

Figure 6:
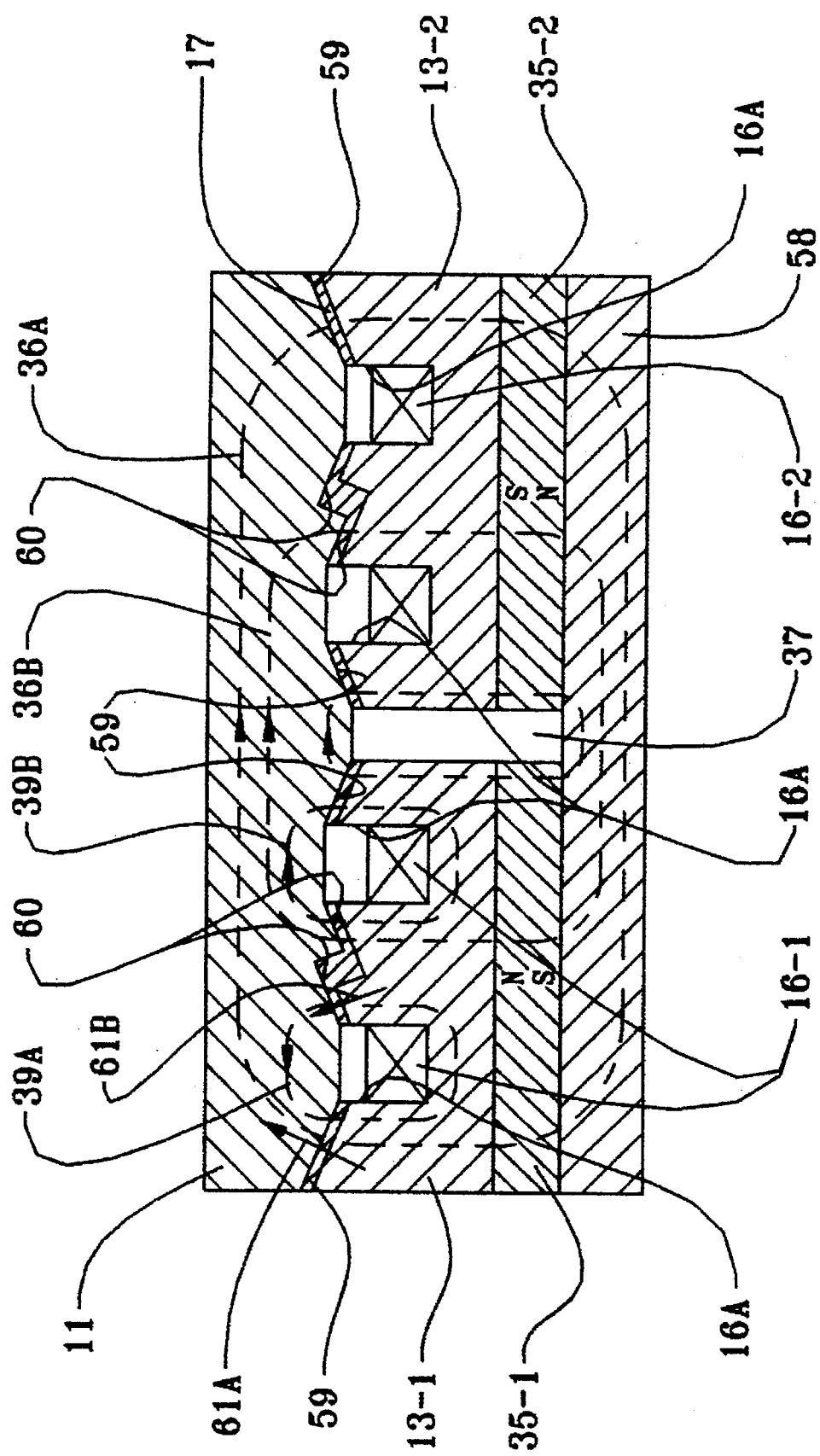
FIG. 6 is a section view of a 2 DOF electromagnetic actuator utilizing two permanent magnets to produce bias flux.

FIG. 6 illustrates use of two bias magnets 35-1 and 35-2 in a 2 DOF actuator in which embedded coils 16-1 and 16-2 are included in separate bodies of electromagnets 13-1 and 13-2, respectively. Bias magnet 35-1, with its north and south poles oriented as indicated, is disposed between the bottom of the body of electromagnet 13-1 and a ferromagnetic base 58; similarly, bias magnet 35-2, with its north and south poles oriented as indicated, is disposed between the body of electromagnet 13-2 and ferromagnetic base 58. Thus, a non-magnetic region 37 separates electromagnets 13-1 and 13-2. The two bias magnets 35-1 and 35-2 oriented as shown produce bias flux through a path and in a direction indicated by dotted line 36-A that passes through "interior" facets 59 of both electromagnets. Bias magnets 35-1 and 35-2 also provide bias flux through a path and in the direction indicated by dotted line 36-B, which passes upward through "interior" facets 60. Interior facets 60 are sloped in the opposite direction to exterior facets 59.

Control currents in coils 16-1 and 16-2 produce control flux in the directions and along the paths indicated by dotted lines 39A and 39B in each of electromagnets 13-1 and 13-2. A control current in coil 16-1 increases the magnetic flux passing through interior facets 60 and decreases the net flux passing through exterior facets 59, thereby increasing the compressive force on the interior facets and decreasing the compressive force on the exterior facets. The interior facets 60 are sloped in the direction opposite to that of exterior facets 59 to prevent the increasing force on the interior facets from tending to cancel the decreasing force on the exterior facets, which would result in less translation of ferromagnetic target 11. Consequently, the effective increased coil current shifts the net force vector from the direction indicated by dotted line 61A to the direction indicated by dotted line 61B.

Figure 7:
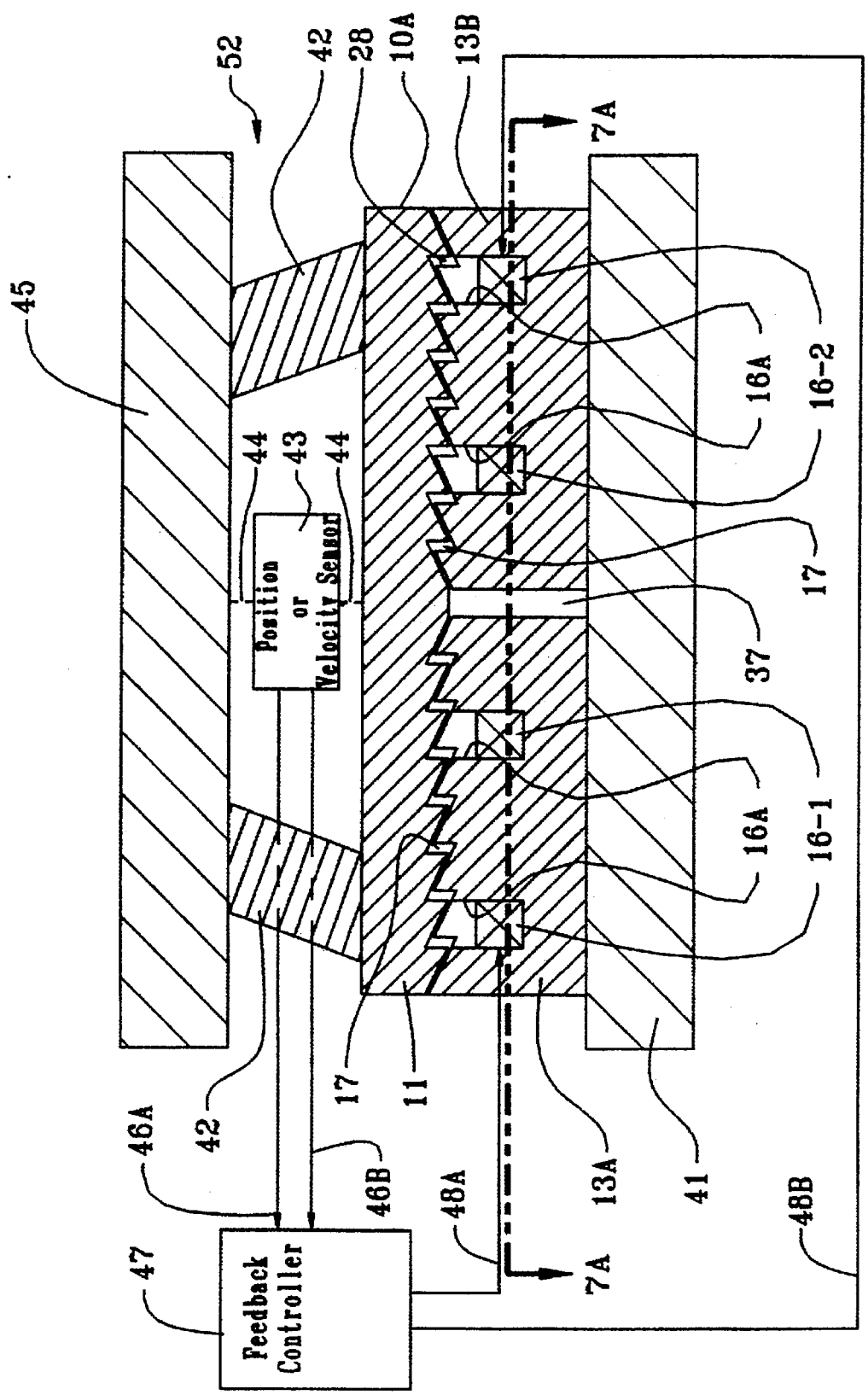
FIG. 7 is a section view diagram illustrating a vibration isolation system using a 2 DOF electromagnetic actuator of the present invention.
Figure 7A:
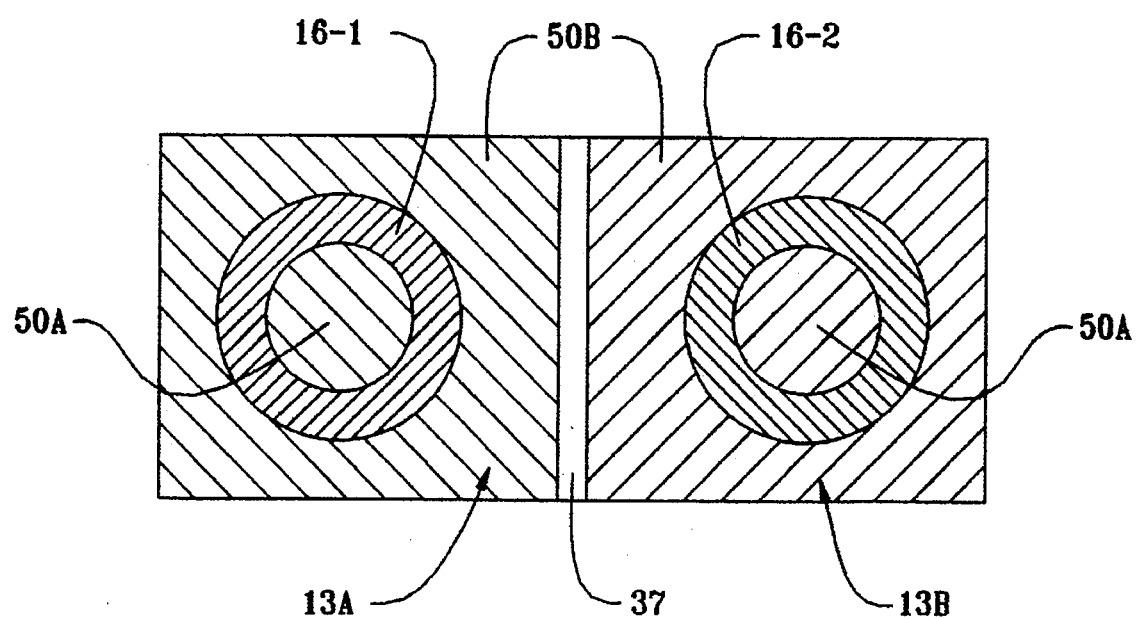
FIG. 7A is a section view across section line 7A—7A of FIG. 7.

FIGS. 7 and 7A illustrate a 2 DOF actuator 10A combined with a 2 DOF position sensor or velocity sensor 43 and a feedback controller 47 to provide a 2 DOF vibration isolation mount for a table 45. Electromagnets 13A and 13B are rigidly attached to a support plate 41, which can be anchored to a suitable reference or ground surface that is subject to vibration from which table 45 is to be isolated (or vice versa). Electromagnets 13A and 13B support a single ferromagnetic target 11 by means of elastomer 28 filling (or partially filling) gaps 17 defined by sloped facet surfaces of electromagnets 13 and 13A and ferromagnetic target 11, as previously described. An elastomer vibration isolator 42, which can be natural or synthetic rubber, the structure and operation of which supports table 45. The elastomer vibration isolator serves to isolate high frequencies (above 40 hertz) whereas the actuator is controlled to cancel motions in the frequency range 1 to about 50 Hz. The elastomer mount is considerably "softer" than the actuator due to its much larger vertical dimension. It should be appreciated that elastomer 28 in gap 17 is relatively stiff compared to elastomer vibration isolator 42; hence elastomer 28 provides little or no vibration isolation and instead simply allows fine motion translation of ferromagnetic target 11 relative to electromagnet 13 in response to variations in the Maxwell force.

A 2 DOF position sensor composed of two 1 DOF position sensors such as a commercially available linear variable displacement sensor (LVDT) available from Transtek of Ellington, Conn., USA, as part no. 0215-0000, or a 2 DOF velocity sensor composed of two 1 DOF sensors such as a 0100-0000 designated by numeral 43, available from Transtek, Inc. of Ellington, Conn., USA, is mechanically coupled by connecting elements 44 between a suitable point of table 45 and a suitable point of ferromagnetic target plate 11.

2 DOF position or velocity sensor 43 produces two signals 46A and 46B indicating the velocity or position of ferromagnetic target plate 11 relative to table 45 along two different axes. Signals 46A and 46B are applied to inputs of a feedback controller system 47, which produces a control current indicated by numeral 48A to coil 16-1 of electromagnet 13A and a control current 48B to coil 16-2 of electromagnet 13B to correct or adjust the two-dimensional translation of ferromagnetic target plate 11 and thereby cancel the vibration being imparted to electromagnets 13A and 13B from the vibrating ground or support to which plate 41 is connected, thereby effectively isolating table 45 from such vibration. For the configuration shown, the "stiffness" of actuator 10A is much greater than that of elastomeric support 42, so actuator 10A acts largely as a displacement transducer with a nonlinear current-displacement characteristic $$x=N(i)$$

where x is the vector of displacement across the actuator, i is the vector of input currents to actuator coils 16-1 and 16-2, and N is a nonlinear function relating the two. N is invertible for a range of displacements, so for each desired displacement in this range, a current vector i can be calculated in the control system 47. Once the inversion of the non-linearity is made, the system appears to be linear, and linear multi-variable controllers can be designed using software packages such as MATLAB from The Mathworks Inc., and XMATH from Integrated Systems Incorporated, and associated software toolboxes for designing controllers with the so-called LQG, $H_2$, and $H_\infty$ methodologies. The resulting linear multi-variable controller may use all of the sensor outputs produced by relative motion of the table to control every actuator operating to effectuate vibration control.

FIG. 7A shows a section view across section line 7—7 of FIG. 7, indicating the electromagnet coil configuration. As indicated earlier, the area 50A within coils 16-1 and 16-2 should be approximately equal to the area 50B outside the coils.

Figure 8:
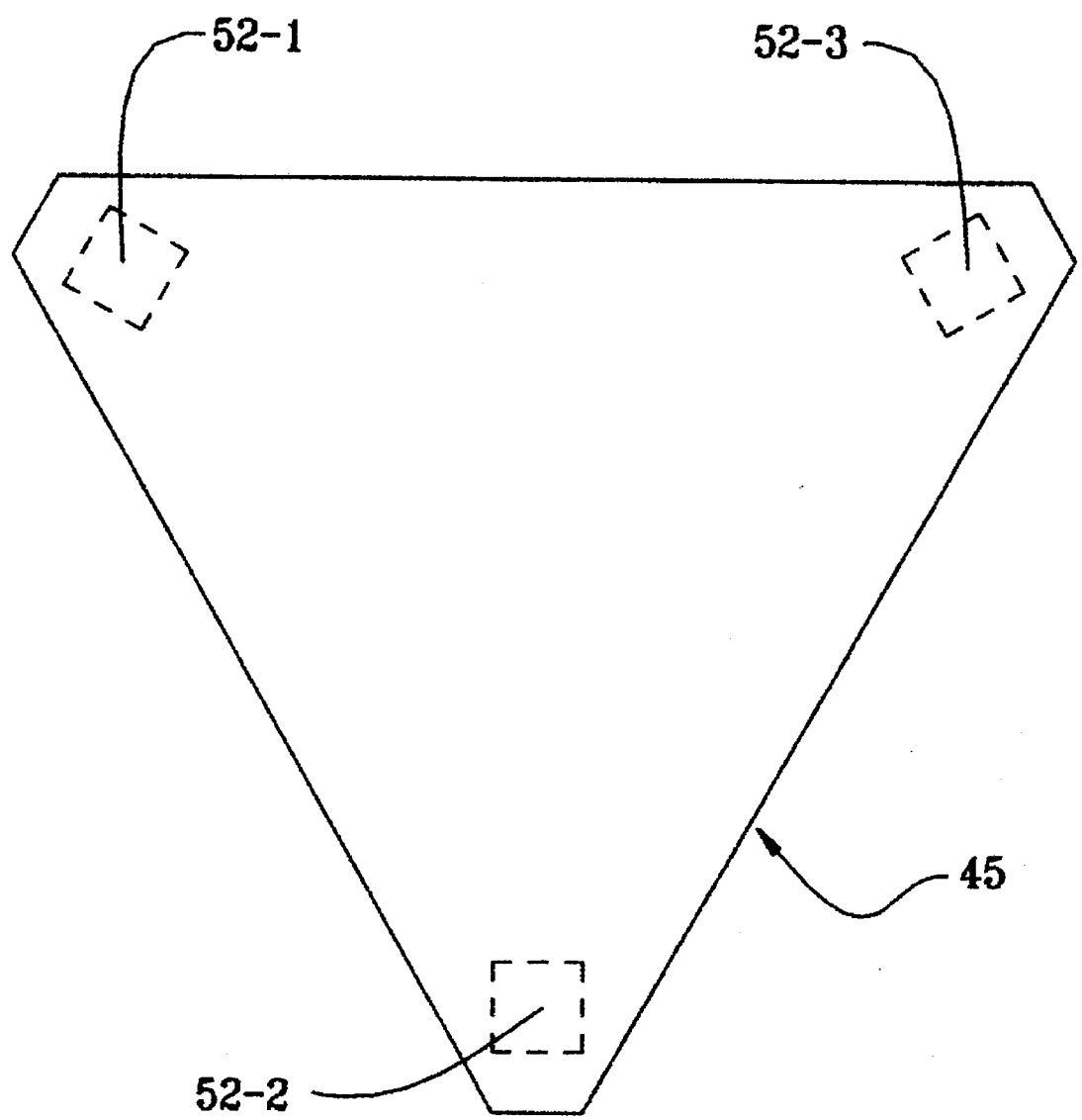
FIG. 8 is a top view of a table isolated from external vibrations using electromagnetic actuators of the present invention.

FIG. 8 shows how three 2 DOF actuators of the present invention can be used in support posts to provide a vibration isolation system for a table. The control current supplied to each of the actuators may depend on all six signals provided by three 2 DOF position or velocity sensors 43. More specifically, three 2 DOF actuators 52-1,2, and 3 are provided at three support points of table 45. Each of the 2 DOF actuators, collectively referred to by numeral 52, is supported on a corresponding post 54 and supports an intermediate stage 53 formed of elastomer and supporting table 45. Each of the three support points of table 45 is coupled by the 2 DOF position or velocity sensor 43 in the manner previously described with reference to FIG. 7 to supply two feedback signals to a single feedback controller. In response, the feedback controller controls the coil currents of all six coils of the three 2 DOF actuators 52-1,2,3 so as to control the vibration sensed by 2 DOF position or vibration sensors 43 and cancel the vibrations before they reach the three support points of table 45, or damp vibrations produced by tabletop equipment.

Figure 9:
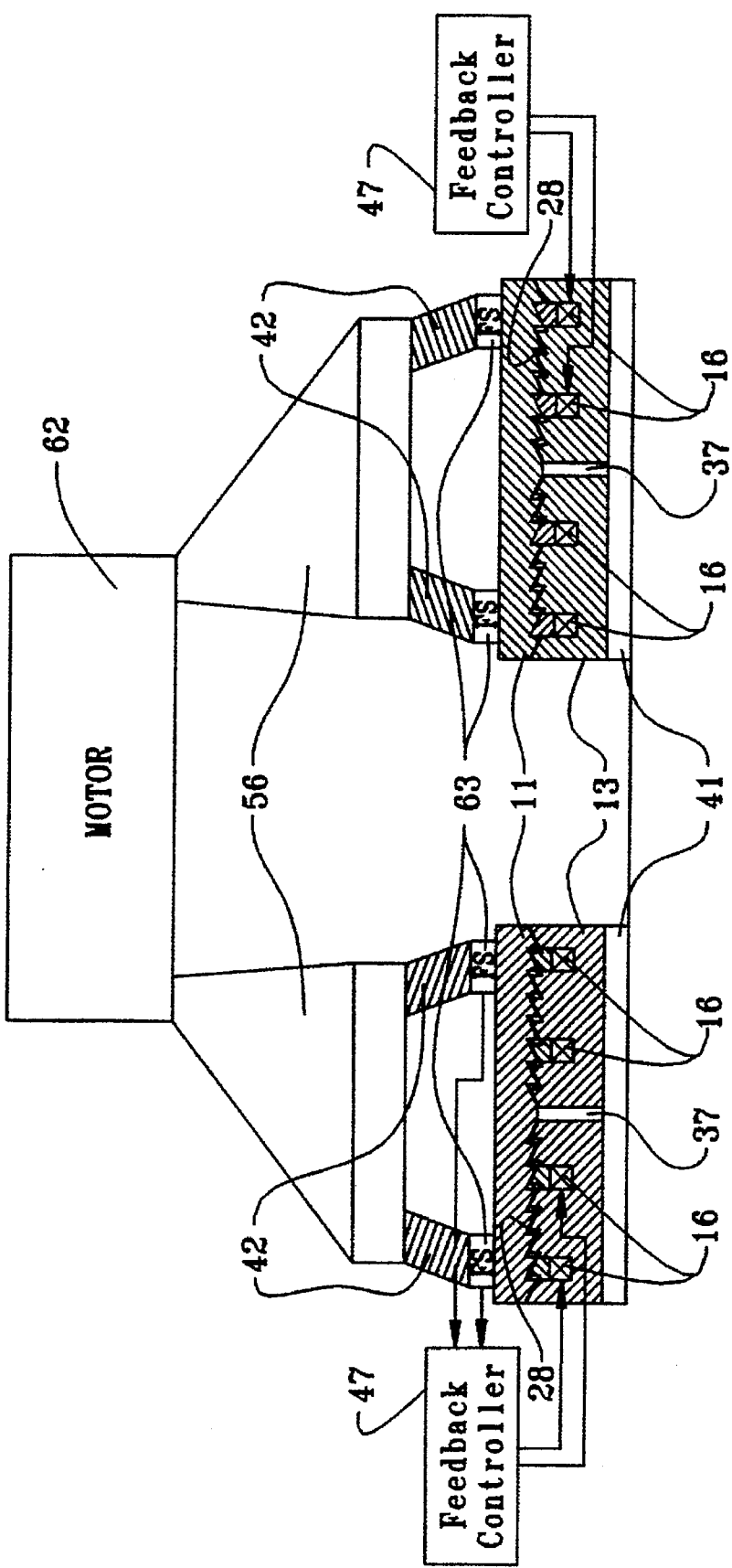
FIG. 9 is a diagram illustrating a vibration isolation system adapted for use in an engine mount.

FIG. 9 shows a vibration cancellation system embodied in a motor mount system for a motor 62 that vibrates when running. The system couples the motor vibrations transmitted through motor mounts 56 to elastomer vibration isolator 42, which eliminates most of the higher frequency (i.e., greater than about 50 hertz) vibrations. Force sensors 63, which can be piezoelectric force sensors, then measure the forces associated with transmission of the low frequency vibrations from elastomer vibration isolator 42 to ferromagnetic target plate 11. In each motor mount system, controller 47 responds to the vibration force signals from force sensor 63 and generates a cancellation current signal to coil 16 to cause cancellation forces to be applied by electromagnet 13 to ferromagnetic plate 11.

As shown in FIG. 10, the elastomer of actuator 10 can be external to gap 17. In FIG. 10, external annular elastomer 28A is positioned between extensions or attachments 64 and 65 of ferromagnetic plate 11 and electromagnet 13, respectively, and maintains the nominal spacing of gap 17 and also allows the desired translation of ferromagnetic plate 11 in response to Maxwell force generated by electromagnet 13.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

For example, in FIG. 7, a force sensor can be disposed in series with the elastomer connection 42 to provide the feedback signals 46A and 46B. Thus, force sensors (e.g., piezoelectric ceramic type or piezoelectric polymer type) in series with the actuator may be used to measure and control actuator motion in 2, 3 or more degree of freedom. Also, more than three active mounts can be used to support a table so as to distribute static loads more uniformly. Note that the elastomer 42 and sensor 43 can be disposed between the support plate and electromagnets 13A and 13B instead of between table 45 and ferromagnetic target 11 if desired.

What is claimed is:

1. An electromagnetic actuator comprising in combination:

(a) a first piece of ferromagnetic material having a first surface including a plurality of sloped facets;

(b) an electromagnet including i. a second piece of ferromagnetic material having a second surface having a plurality of sloped facets corresponding, respectively, to the sloped facets of the first surface, the first surface and the second surface bounding a non-uniform gap, the sloped facets of the first and second surfaces defining a first portion of the gap, a second portion of the gap being defined by a remaining portion of the first surface and a remaining portion of the second surface, a thickness of the first portion of the gap being substantially less than a thickness of the second portion of the gap, whereby a Maxwell force between the first and second pieces of ferromagnetic material compresses an elastomeric material disposed to elastically couple the first and second pieces of ferromagnetic material and resist the Maxwell force between the first and second pieces of ferromagnetic material and urges translation of the first piece of ferromagnetic material relative to the second piece of ferromagnetic material in a direction perpendicular to the sloped facets; and (c) a coil disposed in a coil slot in the second piece of ferromagnetic material adjacent to the second surface and adapted to receive a coil current producing magnetic flux flowing across the gap perpendicular to the first portion thereof and generating the Maxwell force between the first and second pieces of ferromagnetic material in a direction perpendicular to the sloped facets.

2. The electromagnetic actuator of claim 1 wherein the elastomeric material is located in the gap between first and second elements.

3. An electromagnetic actuator comprising in combination:

(a) a first piece of ferromagnetic material having a first surface;

(b) a second piece of ferromagnetic material having a second surface, the first surface and the second surface bounding a non-uniform gap traversed by magnetic flux;

(c) elastomeric material resisting force between the first and second pieces of ferromagnetic material due to magnetic flux traversing the gap;

(d) a coil disposed in a coil slot in the first piece of ferromagnetic material adjacent to the first surface and adapted to receive a coil current producing the magnetic flux, the magnetic flux producing a Maxwell force between the first and second pieces of ferromagnetic material;

(e) the first surface including a plurality of sloped facets, the second surface including a like plurality of similarly sloped facets aligned with the sloped facets of the first surface, respectively, the sloped facets of the first and second surfaces defining a first portion of the gap, a second portion of the gap being defined by a second portion of the first and second surfaces, a thickness of the first portion of the gap being substantially less than a thickness of the second portion of the gap, whereby the Maxwell force between the first and second pieces of ferromagnetic material compresses the elastomeric material and urges translation of the first piece of ferromagnetic material relative to the second piece of ferromagnetic material in a direction perpendicular to the sloped facets.

4. The electromagnetic actuator of claim 3 including a first connecting element attached rigidly to the first piece of ferromagnetic material and adapted to connect the first piece of ferromagnetic material to a first member.

5. The electromagnetic actuator of claim 4 including a second connecting element attached rigidly to the second piece of ferromagnetic material and adapted to connect the second piece of ferromagnetic material to a second member.

6. The electromagnetic actuator of claim 3 wherein the elastomeric material fills the first and second portions of the gap.

7. The electromagnetic actuator of claim 3 wherein the sloped facets are parallel.

8. The electromagnetic actuator of claim 3 wherein the sloped facets are concentric.

9. An electromagnetic actuator comprising in combination:

first and second actuator assemblies, each including
  i. a first piece of ferromagnetic material having a first surface,
  ii. a second piece of ferromagnetic material having a second surface, the first surface and the second surface bounding a non-uniform gap traversed by magnetic flux,
  iii. elastomeric material resisting force between the first and second pieces of ferromagnetic material due to magnetic flux traversing the gap,
  iv. a coil disposed in a coil slot in the second piece of ferromagnetic material adjacent to the second surface and adapted to receive a coil current producing the magnetic flux, the magnetic flux producing a Maxwell force between the first and second pieces of ferromagnetic material,
  v. the first surface including a plurality of sloped facets, the second surface including a like plurality of similarly sloped facets aligned with the sloped facets of the first surface, respectively, the sloped facets of the first and second surfaces defining a first portion of the gap, a second portion of the gap being defined by a remaining portion of the first surface and a remaining portion of the second surface, a thickness of the first portion of the gap being substantially less than a thickness of the second portion of the gap, whereby the Maxwell force between the first and second pieces of ferromagnetic material compresses the elastomeric material and urges translation of the first piece of ferromagnetic material relative to the second piece of ferromagnetic material in a direction perpendicular to the sloped facets, the second piece of ferromagnetic material of the first actuator assembly being attached in fixed series relationship with the first piece of ferromagnetic material of the second actuator assembly, the sloped facets of the first surface of the first actuator assembly being oriented in a first direction, the sloped facets of the first surface of the second actuator assembly being oriented in a second direction different than the first direction, whereby the electromagnetic actuator is operable with at least two degrees of freedom.

10. The electromagnetic actuator of claim 9 wherein the first direction is perpendicular to the second direction.

11. An electromagnetic actuator comprising in combination:

(a) a first piece of ferromagnetic material having a first surface, the first surface including a plurality of sloped facets;

(b) first and second electromagnets, each including
  i. a second piece of ferromagnetic material having a second surface, the first surface and the second surface bounding a gap traversed by magnetic flux,
  ii. elastomeric material resisting force between the first piece of ferromagnetic material and the second piece of ferromagnetic material due to magnetic flux traversing the gap,
  iii. a coil disposed in a coil slot in the second piece of ferromagnetic material adjacent to the second surface and adapted to receive a coil current producing the magnetic flux, the magnetic flux producing a Maxwell force between the first piece of ferromagnetic material and the second piece of ferromagnetic material,
  iv. the second surface including a plurality of sloped facets aligned with some sloped facets of the first surface, respectively, such sloped facets of the first surface and the sloped facets of the second surface defining a first portion of the gap, a second portion of the gap being defined by a remaining portion of the first surface and a remaining portion of the second surface, a thickness of the first portion of the gap being substantially less than a thickness of the second portion of the gap, whereby the Maxwell force between the first piece of ferromagnetic material and the second piece of ferromagnetic material compresses the elastomeric material and urges translation of the first piece of ferromagnetic material relative to the second piece of ferromagnetic material in a direction perpendicular to the sloped facets of the second surface of the piece of ferromagnetic material, the second piece of ferromagnetic material of the first electromagnet being attached fixed in parallel relationship with the second piece of ferromagnetic material of the second electromagnet, the sloped facets of the second surface of the first electromagnet being oriented in a first direction, the sloped facets of the second surface of the second electromagnet being oriented in a second direction different than the first direction, whereby the electromagnetic actuator is operable with at least two degrees of freedom.

12. A vibration control system comprising in combination:

(a) a first piece of ferromagnetic material having a first surface, the first surface including a plurality of sloped facets;

(b) first and second electromagnets, each including
 i. a second piece of ferromagnetic material having a second surface, the first surface and the second surface bounding a gap traversed by magnetic flux,
 ii. elastomeric material resisting force between the first piece of ferromagnetic material and the second piece of I ferromagnetic material due to magnetic flux traversing the gap,
 iii. a coil disposed in a coil slot in the second piece of ferromagnetic material adjacent to the second surface and adapted to receive a coil current producing the magnetic flux, the magnetic flux producing a Maxwell force between the first piece of ferromagnetic material and the second piece of ferromagnetic material,
 iv. the second surface including a plurality of sloped facets aligned with some sloped facets of the first surface, respectively, such sloped facets of the first surface and the sloped facets of the second surface defining a first portion of the gap, a second portion of the gap being defined by a remaining portion of the first surface and a remaining portion of the second surface, a thickness of the first portion of the gap being substantially less than a thickness of the second portion of the gap, whereby the Maxwell force between the first piece of ferromagnetic material and the second piece of ferromagnetic material compresses the elastomeric material and urges translation of the first piece of ferromagnetic material relative to the second piece of ferromagnetic material in a direction perpendicular to the sloped facets of the second surface of the second piece of ferromagnetic material, the second piece of ferromagnetic material of the first electromagnet being attached in parallel relationship with the second piece of ferromagnetic material of the second electromagnet, the sloped facets of the second surface of the first electromagnet being oriented in a first direction, the sloped facets of the second surface of the second electromagnet being oriented in a second direction different than the first direction, whereby the electromagnetic actuator is operable with two degrees of freedom;

(c) first and second members, the motion of one of which is to be nearly zero, the first member being connected in vibration-energy-coupling relationship to the first and second electromagnets, the second member being connected in vibration-energy-coupling relationship to the first piece of ferromagnetic material;

(d) a sensor coupled between the first member and the first piece of ferromagnetic material to measure a parameter representing an amount of vibration energy coupled between the first member and the first piece of ferromagnetic material and produce a signal representing the measured parameter; and (e) a controller receiving the signal and producing a current in the coil of the first electromagnet to cause adjustment of the Maxwell force so as to reduce the signal representing the measured parameter.

13. The vibration control system of claim 12 wherein the sensor is a velocity sensor.

14. The vibration control system of claim 12 wherein the sensor is a position sensor.

15. The vibration control system of claim 12 wherein the sensor is a force sensor.

16. The vibration control system of claim 12 wherein the sensor is coupled between the first member and the first piece of ferromagnetic material by means of an elastomer vibration isolator.

17. A method of producing mechanical translation, comprising the steps of:

(a) providing a first group of sloped facets on a first surface of a piece of ferromagnetic material, and also providing a plurality of corresponding sloped facets on a second surface of a first electromagnet, the sloped facets on the second surface being aligned with and equi-spaced from the sloped facets of the first group, respectively;

(b) elastically coupling the piece of ferromagnetic material and the first electromagnet to provide a first non-uniform gap between the first and second surfaces, active portions of the first non-uniform gap being defined by the aligned sloped facets, the active portions of the first non-uniform gap being substantially thinner than remaining portions of the first non-uniform gap;

(c) forcing a first current through a first coil of the first electromagnet to produce magnetic flux most of which flows across the active portions of the first non-uniform gap producing a first Maxwell force between the piece of ferromagnetic material and the first electromagnet in a first direction perpendicular to the sloped facets of the second surface, the first Maxwell force urging translation of the piece of ferromagnetic material parallel to the first direction.

18. The method of claim 17 wherein the first direction is inclined with respect to a mean plane of the first surface.

19. The method of claim 17 including the steps of:

(d) providing a second group of sloped facets on the first surface, the sloped facets of the second group being oriented in a different direction than the sloped facets of the first group, and providing a plurality of sloped facets on a third surface of a second electromagnet, the sloped facets of the third surface being aligned with and equi-spaced from the sloped facets of the second group, respectively;

(e) connecting the second electromagnet in fixed parallel relationship with the first electromagnet;

(f) elastically coupling the piece of ferromagnetic material and the second electromagnet to provide a second non-uniform gap between the first and third surfaces, active portions of the second non-uniform gap being defined by the aligned sloped facets of the second group and the third surface, the active portions of the second non-uniform gap being substantially thinner than remaining portions of the second non-uniform gap;

(g) forcing a second current through a second coil of the second electromagnet to produce magnetic flux most of which flows across the active portion of the second non-uniform gap producing a second Maxwell force between the piece of ferromagnetic material and the second electromagnet in a second direction perpendicular to the sloped facets of the third surface, the second Maxwell force urging translation of the piece of ferromagnetic material parallel to the second direction.

20. A method of producing mechanical translation, comprising the steps of:
   (a) providing at least one sloped facet on a first surface of a piece of ferromagnetic material, and also providing at least one corresponding sloped facet on a second surface of a first electromagnet, the sloped facet on the second surface being aligned with and equi-spaced from the sloped facet of the first surface, the sloped facets of the first and second surfaces bounding a first gap;
   (b) providing at least one sloped facet on a third surface of a second electromagnet, and providing a corresponding sloped facet on the first surface, the sloped facet of the third surface being aligned with and equi-spaced from the corresponding sloped facet of the first surface, the sloped facet of the third surface being oriented in a different direction than the sloped facet of the second surface, the sloped facet of the third surface and the corresponding sloped facet of the first surface bounding a second gap;
   (c) connecting the second electromagnet in fixed parallel relationship with the first electromagnet;
   (d) elastically coupling the piece of ferromagnetic material and the second electromagnet, and elastically coupling the piece of ferromagnetic material and the second electromagnet;
   (e) forcing a first current through a first coil of the first electromagnet to produce magnetic flux which flows across the first gap producing a first Maxwell force between the piece of ferromagnetic material and the first electromagnet in a first direction perpendicular to the sloped facet of the second surface, the first Maxwell force urging translation of the piece of ferromagnetic material parallel to the first direction; and
   (f) forcing a second current through a second coil of the second electromagnet to produce magnetic flux which flows across the second gap producing a second Maxwell force between the piece of ferromagnetic material and the second electromagnet in a second direction perpendicular to the sloped facet of the third surface, the second Maxwell force urging translation of the piece of ferromagnetic material parallel to the second direction.

* * * * *